(12) United States Patent
Sasaki et al.

(10) Patent No.: US 9,847,551 B2
(45) Date of Patent: Dec. 19, 2017

(54) LITHIUM-ION SECONDARY BATTERY

(71) Applicant: NEC Corporation, Tokyo (JP)

(72) Inventors: Hideaki Sasaki, Tokyo (JP); Takehiro Noguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/406,408

(22) PCT Filed: Jun. 7, 2013

(86) PCT No.: PCT/JP2013/065863
§ 371 (c)(1),
(2) Date: Dec. 8, 2014

(87) PCT Pub. No.: WO2013/183769
PCT Pub. Date: Dec. 12, 2013

(65) Prior Publication Data
US 2015/0171468 A1    Jun. 18, 2015

(30) Foreign Application Priority Data

Jun. 8, 2012  (JP) ................. 2012-131425

(51) Int. Cl.
H01M 10/056    (2010.01)
H01M 10/0567   (2010.01)
(Continued)

(52) U.S. Cl.
CPC ....... H01M 10/0567 (2013.01); H01M 4/131 (2013.01); H01M 4/505 (2013.01);
(Continued)

(58) Field of Classification Search
CPC ................ H01M 10/0569; H01M 10/0567
See application file for complete search history.

(56) References Cited

U.S. PATENT DOCUMENTS 4,810,400 A * 3/1989 Shinozaki .......... H01G 9/022
                                              252/62.2
5,731,106 A    3/1998 Tsutsumi et al.
(Continued)

FOREIGN PATENT DOCUMENTS

JP    7-220757    8/1995
JP    07-320778   12/1995
(Continued)

OTHER PUBLICATIONS

International Search Report dated Aug. 13, 2013 in corresponding PCT International application.
(Continued)

Primary Examiner — Stewart Fraser
Assistant Examiner — Olatunji Godo
(74) Attorney, Agent, or Firm — Finnegan, Henderson, Farabow, Garrett & Dunner, L.L.P.

(57) ABSTRACT

An objective of the present invention is to provide an electrolyte solution effective for reducing the amount of gas generated in a charge-discharge cycle of a lithium-ion secondary battery, preferably a lithium-ion secondary battery using a 5 V-class positive electrode. The present invention relates to a non-aqueous electrolyte solution comprising at least one type of aniline derivative represented by a predetermined formula, and a non-aqueous solvent, and to a lithium-ion secondary battery using the same.

12 Claims, 1 Drawing Sheet

(51) Int. Cl.
  *H01M 4/505* (2010.01)
  *H01M 10/052* (2010.01)
  *H01M 4/58* (2010.01)
  *H01M 10/0525* (2010.01)
  *H01M 4/131* (2010.01)
  *H01M 10/0569* (2010.01)

(52) U.S. Cl.
  CPC ......... *H01M 4/582* (2013.01); *H01M 10/052* (2013.01); *H01M 10/0525* (2013.01); *H01M 10/0569* (2013.01); *H01M 2220/20* (2013.01); *H01M 2220/30* (2013.01); *H01M 2300/0025* (2013.01); *H01M 2300/0034* (2013.01); *Y02E 60/122* (2013.01); *Y02P 70/54* (2015.11)

(56) References Cited

U.S. PATENT DOCUMENTS

| | | | |
|---|---|---|---|
| 2005/0053843 A1* | 3/2005 | Takahashi | H01M 10/0565 429/329 |
| 2008/0020285 A1 | 1/2008 | Horikawa | |
| 2009/0130567 A1* | 5/2009 | Segawa | H01G 9/022 429/335 |
| 2011/0294019 A1* | 12/2011 | Amine | H01M 10/052 429/338 |

FOREIGN PATENT DOCUMENTS

| | | |
|---|---|---|
| JP | 08-138649 | 5/1996 |
| JP | 10-188985 | 7/1998 |
| JP | 2002-042814 | 2/2002 |
| JP | 2002-358959 | 12/2002 |
| JP | 2008-053211 | 3/2008 |
| JP | 2008-112681 | 5/2008 |
| JP | 09-204932 | 8/2008 |
| JP | 2008-192504 | 8/2008 |
| JP | 2010-050023 | 3/2010 |
| JP | 2010-146740 | 7/2010 |

OTHER PUBLICATIONS

Notice of Reasons for Rejection issued by the Japanese Patent Office in counterpart Japanese Patent Application No. 2014-520072 dated Jan. 31, 2017.

* cited by examiner

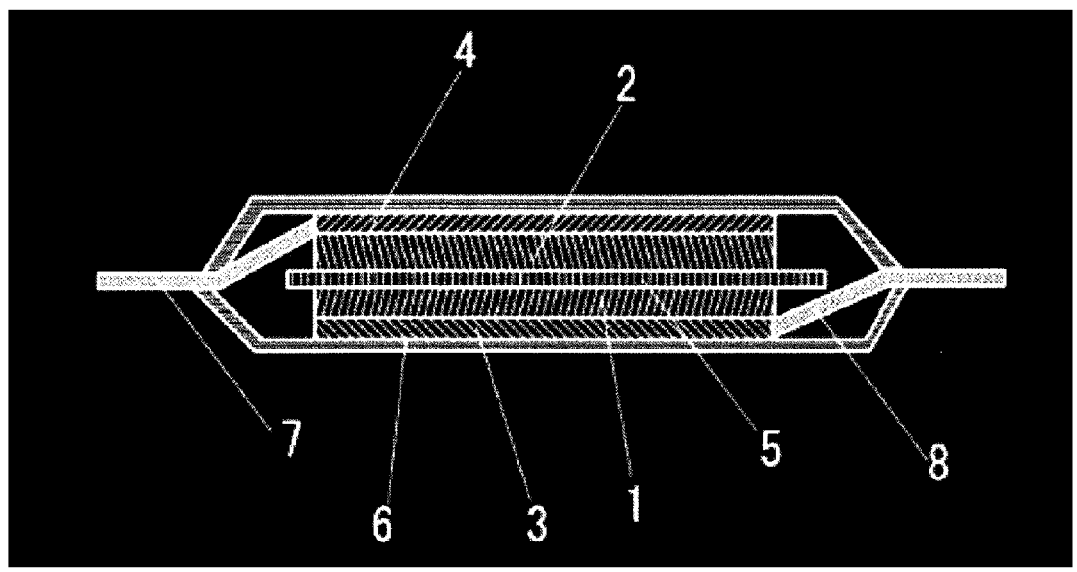

LITHIUM-ION SECONDARY BATTERY

CROSS-REFERENCE TO RELATED PATENT APPLICATIONS

This application is a National Stage Entry of International Application No. PCT/JP2013/065863, filed Jun. 7, 2013, which claims priority from Japanese Patent Application No. 2012-131425, filed Jun. 8, 2012. The entire contents of the above-referenced applications are expressly incorporated herein by reference.

TECHNICAL FIELD

The present invention relates to a non-aqueous electrolyte solution and a lithium-ion secondary battery using the same.

BACKGROUND ART

Lithium-ion secondary batteries are widely adopted as power supplies for small-sized equipment because they have a small volume and a large mass capacity density, and can provide a high voltage. For example, lithium-ion secondary batteries are used as power supplies for mobile equipment such as a mobile phone and a laptop computer. Moreover, in recent years, application of the lithium ion secondary battery not only to small mobile devices but also to large secondary batteries in the field of electric vehicles (EV), electric power storage, or the like where a large capacity with long life is required has been expected, based on concern for environmental problems and improvement in consciousness of energy conservation.

In currently commercially available lithium-ion secondary batteries, one based on $LiMO_2$ (M is at least one of Co, Ni, and Mn) having a layered structure or $LiMn_2O_4$ having a spinel structure is used as a positive electrode active material. As a negative electrode active material, carbon materials such as graphite are used. As a voltage of such a battery, a charge-discharge region of 4.2 V or less is mainly used.

On the other hand, it is known that a material in which a part of Mn in $LiMn_2O_4$ with Ni or the like is replaced exhibits a high charge-discharge region of 4.5 to 4.8 V versus lithium metal. More specifically, a spinel compound such as $LiNi_{0.5}Mn_{1.5}O_4$ exhibits a high operating voltage of 4.5 V or more because Mn is present in a state of $Mn^{4+}$ and oxidation-reduction of $Ni^{2+}$ and $Ni^{4+}$ is utilized, which is not conventional oxidation-reduction of $Mn^{3+}$ and $Mn^{4+}$. Such a material is called a 5 V-class active material, and can achieve an improvement in an energy density by increasing a voltage, and therefore, is expected as a promising positive electrode material.

However, there was a problem in that, when the voltage of the positive electrode becomes high, cycle deterioration of the battery increases due to, for example, the gas generation caused by oxidative decomposition of the electrolyte solution, a by-product generated in associated with the decomposition of the electrolyte solution and elution of metal ions such as Mn and Ni in the positive electrode active material, which deposit on the negative electrode to accelerate deterioration of the negative electrode. In particular, in practical use of a 5 V-class positive electrode, gas generation has been a major obstacle.

As a method for suppressing cycle deterioration and gas generation of a lithium-ion battery, a SEI (Solid Electrolyte Interface) film formation has been conducted on the surface of an active material by adding additives to an electrolyte solution. The SEI film is an electronically insulating body but is considered to have a lithium ion conducting property, and functions to prevent a reaction between the active material and the electrolyte solution. Many of such additives form a film on the negative electrode. However, since a 5 V-class active material is dominantly affected by decomposition of the electrolyte solution in the positive electrode, these additives that form a film on the negative electrode have not obtained a sufficient effect against gas generation.

On the other hand, an attempt for improving battery performances has been conducted by performing surface treatment on a positive electrode active material. For example, there is disclosed a technique of improving battery performances by covering the surface of a positive electrode or a positive electrode active material with a conductive polymer typified by polyaniline by a method of electrolytic oxidation or chemical oxidation (Patent Literature 1 to 3). However, in these Patent Literatures, additives that exhibit an effect of suppressing gas generation of a 5 V-class active material are not specifically described at all.

CITATION LIST

Patent Literature

Patent Literature 1: Japanese Patent Laid-Open No. 08-138649
Patent Literature 2: Japanese Patent Laid-Open No. 2002-358959
Patent Literature 3: Japanese Patent Laid-Open No. 10-188985

SUMMARY OF INVENTION

Technical Problem

It is an object of the present invention to provide an electrolyte solution effective of reducing the amount of gas generated in a charge-discharge cycle of a lithium-ion secondary battery, preferably a lithium-ion secondary battery using a 5 V-class positive electrode.

Solution to Problem

The present invention relates to a non-aqueous electrolyte solution comprising at least one type of aniline derivative represented by the following formula (1), and a non-aqueous solvent.

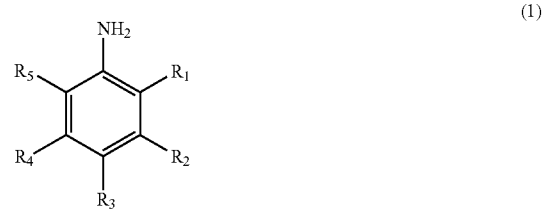

wherein substituents $R_1$ to $R_5$ each independently represent a hydrogen atom, a halogen atom, alkyl group, vinyl group, alkoxy group, halogenated alkyl group, halogenated vinyl group, or halogenated alkoxy group, and the number of carbon atoms of each of the alkyl group, the alkoxy group, the halogenated alkyl group, and the halogenated alkoxy group is 1 or 2.

In the formula (1), the total number of halogen atoms is 5 or less, and among the substituents $R_1$ to $R_5$, the number of the substituents other than a hydrogen atom and a halogen atom is 1 or 2.

Advantageous Effects of Invention

When the non-aqueous electrolyte solution of the present embodiment contains the aniline derivative represented by the formula (1), a decomposition reaction of the non-aqueous electrolyte solution is suppressed, and gas generation in a high-temperature charge-discharge cycle can be reduced in a secondary battery using this non-aqueous electrolyte solution.

BRIEF DESCRIPTION OF DRAWING

FIG. 1 is a cross-sectional view showing one example of a secondary battery according to the present embodiment.

DESCRIPTION OF EMBODIMENTS (Non-Aqueous Electrolyte Solution)

A non-aqueous electrolyte solution of the present embodiment contains at least one aniline derivative represented by the following formula (1), and a non-aqueous solvent.

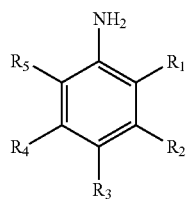

(1)

wherein substituents $R_1$ to $R_5$ each independently represent a hydrogen atom, a halogen atom, alkyl group, vinyl group, alkoxy group, halogenated alkyl group, halogenated vinyl group, or halogenated alkoxy group, and the number of carbon atoms of each of the alkyl group, the alkoxy group, the halogenated alkyl group, and the halogenated alkoxy group is 1 or 2.

In the formula (1), the total number of halogen atoms is 5 or less, and among the substituents $R_1$ to $R_5$, the number of the substituents other than a hydrogen atom and a halogen atom is 1 or 2.

When the non-aqueous electrolyte solution of the present embodiment contains the aniline derivative represented by the formula (1), a decomposition reaction of the non-aqueous electrolyte solution is suppressed, and gas generation in a high-temperature charge-discharge cycle can be reduced. This is considered that the aniline derivative represented by the formula (1) forms a high-quality film on the surface of a positive electrode active material by oxidative polymerization, and as a result, a decomposition reaction of the electrolyte solution is suppressed, and gas generation in a high-temperature charge-discharge cycle can be reduced. The non-aqueous electrolyte solution of the present embodiment can more exert the effect in a secondary battery containing a 5 V-class positive electrode active material having a large problem of gas generation in the electrode.

Hereinafter, in the present specification, the aniline derivative represented by the formula (1) is sometimes simply referred to as an "aniline derivative". In the present specification, the substituent of the aniline derivative represented by the formula (1) refers to any of the substituents selected from $R_1$ to $R_5$, in which —$NH_2$ group is not included.

In the formula (1), the substituents $R_1$ to $R_5$ each independently represent a hydrogen atom, a halogen atom, alkyl group, vinyl group, alkoxy group, halogenated alkyl group, halogenated vinyl group, or halogenated alkoxy group.

In the formula (1), examples of the halogen atom as the substituent include fluorine, chlorine, and bromine, and fluorine is preferable.

In the formula (1), the number of carbon atoms of each of the alkyl group and the alkoxy group is 1 or 2. When the number of carbon atoms is 3 or more, film formation may be inhibited by a steric hindrance effect or the like. Examples of the alkyl group include methyl group and ethyl group, and examples of the alkoxy group include methoxy group and ethoxy group.

In the formula (1), each of the halogenated alkyl group, the halogenated vinyl group, and the halogenated alkoxy group indicates a substituent in which a part or all of hydrogens of alkyl group, vinyl group, or alkoxy group are substituted with halogen atoms. Moreover, the number of carbon atoms of each of the halogenated alkyl group and the halogenated alkoxy group is 1 or 2. When the number of carbon atoms is 3 or more, film formation may be inhibited by a steric hindrance effect or the like. Examples of the halogen atom in the halogenated alkyl group, the halogenated vinyl group, and the halogenated alkoxy group include fluorine, chlorine, and bromine, and fluorine is preferable. When fluorine is included in a part of the substituent, an improvement in stability against oxidation of positive electrode film can be expected. Examples of the halogenated alkyl group include —$CF_3$, —$CHF_2$, —$CH_2F$, —$CF_2CF_3$, —$CH_2CF_3$, and —$CH_2CHF_2$. Examples of the halogenated vinyl group include —$CH=CF_2$ and —$CH=CHF$. Examples of the halogenated alkoxy group include —$OCF_3$ and —$OCH_2F$.

In the aniline derivative represented by the formula (1), the total number of halogen atoms is 5 or less. The total number of halogen atoms, as used herein, refers to the total of the number of halogen atoms as the substituents and the number of halogen atoms as a part of the substituents. When the number of halogen atoms contained in the aniline derivative is 6 or more, an oxidative polymerization reaction of the aniline derivative becomes difficult to occur, and it becomes easy to prevent film formation.

Furthermore, in the present embodiment, in the aniline derivative, the number of the substituents other than a hydrogen atom and a halogen atom, that is, the substituents containing carbon atoms is 1 or 2. For example, a non-aqueous electrolyte solution using unsubstituted aniline (i.e., aniline in which all of $R_1$ to $R_5$ in the formula (1) are hydrogen atoms) cannot obtain an effect of suppressing gas generation. The reason for this is not clear, but for example, it is considered that an electron insulating property required for SEI is easy to be impaired because polyaniline is known as a conductive polymer and thus an electron conducting property of a polyaniline film formed on a positive electrode is high. It is also considered that gas is easy to generate because a side reaction is easy to occur when using the unsubstituted aniline. On the other hand, it is considered that, when the number of the substituents containing carbon atoms is too large, a polymerization reaction is prevented by a steric hindrance effect thereof or the like, and a film becomes difficult to be formed.

In the formula (1), the total number of carbon atoms contained in the substituents $R_1$ to $R_5$ is preferably 1 or 2. When the total number of carbon atoms contained in the substituents in all is 3 or more, film formation may be inhibited by a steric hindrance effect or the like.

In the present embodiment, the aniline derivative is not particularly limited, and it is preferable to contain at least one selected from trifluoromethylaniline, methoxyaniline, and methylaniline.

Examples of the aniline derivative in the present embodiment are shown below, but it is not limited to these.

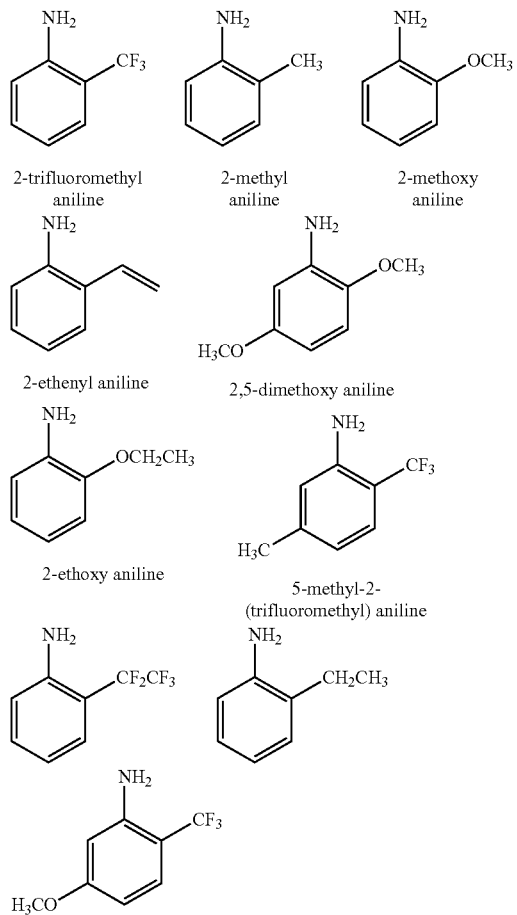

These aniline derivatives may be used singly or in combinations of two or more.

The content of the aniline derivative in the electrolyte solution is preferably 0.1 mass % or more and 1 mass % or less based on the total mass of the non-aqueous electrolyte solution. If the content of the aniline derivative is too small, a film is not sufficiently formed on a positive electrode, and an effect of suppressing a decomposition reaction with an electrolyte solution may become small. On the other hand, if the content of the aniline derivative is too large, the amount of gas generated may be increased because a side reaction of a remaining aniline derivative that is not used for film formation occurs in a charge-discharge cycle.

The non-aqueous solvent contained in the non-aqueous electrolyte solution of the present embodiment is not particularly limited, and for example, at least one organic solvent selected from cyclic carbonate, chain carbonate, aliphatic carboxylic acid ester, γ-lactone, cyclic ether, and chain ether can be used.

Examples of the cyclic carbonate include propylene carbonate (PC), ethylene carbonate (EC), butylene carbonate (BC), and derivatives thereof (including fluorides). Generally, since cyclic carbonate has a high viscosity, it is used in a mixture with chain carbonate so as to decrease the viscosity. Examples of the chain carbonate include dimethyl carbonate (DMC), diethyl carbonate (DEC), ethyl methyl carbonate (EMC), dipropyl carbonate (DPC), and derivatives thereof (including fluorides). Examples of the aliphatic carboxylic acid ester include methyl formate, methyl acetate, ethyl propionate, and derivatives thereof (including fluorides). Examples of the γ-lactone include γ-butyrolactone and a derivative thereof (including fluorides). Examples of the cyclic ether include tetrahydrofuran, 2-methyltetrahydrofuran, and derivatives thereof (including fluorides). Examples of the chain ether include 1,2-ethoxyethane (DEE), ethoxymethoxyethane (EME), diethyl ether, and derivatives thereof (including fluorides). These may be used singly or in combinations of two or more.

In addition, as the non-aqueous solvent, for example, dimethyl sulfoxide, 1,3-dioxolan, formamide, acetamide, dimethylformamide, dioxolan, acetonitrile, propionitrile, nitromethane, ethyl monoglyme, phosphate triester, trimethoxymethane, a dioxolane derivative, sulfolane, methylsulfolane, 1,3-dimethyl-2-imidazolidinone, 3-methyl-2-oxazolidinone, a propylene carbonate derivative, a tetrahydrofuran derivative, anisole, N-methylpyrrolidone, and derivatives thereof (including fluorides) can also be used.

In the present embodiment, it is preferable to contain a fluorine-containing solvent as the non-aqueous solvent. The fluorine-containing solvent refers to a solvent consisting of a compound containing a fluorine atom. Generally, since a fluorine-containing solvent has high oxidation resistivity, decomposition of a solvent on a positive electrode can be suppressed. Moreover, when the electrolyte solution contains the fluorine-containing solvent, an effect of reducing gas generation obtained by the addition of the aniline derivative can be more increased. The reason for this is not clear, but it is considered that, since the fluorine-containing solvent has high oxidation resistivity, a decomposition product derived from the solvent becomes less likely to deposit on the surface of the positive electrode, and as a result, quality of the positive electrode film formed by the aniline derivative may be improved.

In particular, from the viewpoints of solubility of a lithium salt, compatibility with a carbonate solvent, battery performances and the like, the fluorine-containing solvent preferably contains at least one selected from a fluorinated ether compound and a fluorinated phosphate ester compound.

The fluorinated ether compound is not particularly limited, and examples thereof include $CF_3OCH_3$, $CF_3OC_2H_5$, $F(CF_2)_2OCH_3$, $F(CF_2)_2OC_2H_5$, $CF_3(CF_2)CH_2O(CF_2)CF_3$, $F(CF_2)_3OCH_3$, $F(CF_2)_3OC_2H_5$, $F(CF_2)_4OCH_3$, $F(CF_2)_4OC_2H_5$, $F(CF_2)_5OCH_3$, $F(CF_2)_5OC_2H_5$, $F(CF_2)_8OCH_3$, $F(CF_2)_8OC_2H_5$, $F(CF_2)_9OCH_3$, $CF_3CH_2OCH_3$, $CF_3CH_2OCHF_2$, $CF_3CF_2CH_2OCH_3$, $CF_3CF_2CH_2OCHF_2$, $CF_3CF_2CH_2O(CF_2)_2H$, $CF_3CF_2CH_2O(CF_2)_2F$, $HCF_2CH_2OCH_3$, $(CF_3)(CF_2)CH_2O(CF_2)_2H$, $H(CF_2)_2OCH_2CH_3$, $H(CF_2)_2OCH_2CF_3$, $H(CF_2)_2CH_2OCHF_2$, $H(CF_2)_2CH_2O(CF_2)_2H$, $H(CF_2)_2CH_2O(CF_2)_3H$, $H(CF_2)_3CH_2O(CF_2)_2H$, $H(CHF)_2CH_2O(CF_2)_2H$, $(CF_3)_2CHOCH_3$, $(CF_3)_2CHCF_2OCH_3$, $CF_3CHFCF_2OCH_3$, $CF_3CHFCF_2OCH_2CH_3$, $CF_3CHFCF_2CH_2OCHF_2$, $CF_3CHFCF_2OCH_2(CF_2)_2F$, $CF_3CHFCF_2OCH_2CF_2CF_2H$, $H(CF_2)_4CH_2O(CF_2)_2H$, $CH_3CH_2O(CF_2)_4F$, $F(CF_2)_4CH_2O(CF_2)_2H$. The fluorinated ether compounds may be used singly or in combinations of two or more.

The fluorinated phosphate ester compound is not particularly limited, and examples thereof include fluorinated alkyl phosphate ester compounds such as Tris(trifluoromethyl)phosphate, Tris(pentafluoroethyl)phosphate, Tris(2,2,2-trifluoroethyl)phosphate (TTFP), Tris(2,2,3,3-tetrafluoropropyl)phosphate, Tris(3,3,3-trifluoropropyl)phosphate, Tris(2,2,3,3,3-pentafluoropropyl)phosphate. Among them, as the fluorinated phosphate ester compound, Tris(2,2,2-trifluoroethyl)phosphate (TTFP) is preferable. The fluorinated phosphate ester compounds may be used singly or in combinations of two or more.

In the present embodiment, the content of the fluorine-containing solvent is not particularly limited, and it is preferably 30 vol % or more and 90 vol % or less, more preferably 40 vol % or more and 85 vol % or less, and further preferably 50 vol % or more and 80 vol % or less based on the total volume of the non-aqueous solvent.

In the non-aqueous electrolyte solution of the present embodiment, it is preferable that an electrolyte composed of a lithium salt is dissolved in the non-aqueous solvent.

The lithium salt is not particularly limited, and examples thereof include a lithium imide salt, $LiPF_6$, $LiAsF_6$, $LiAlCl_4$, $LiClO_4$, $LiBF_4$, and $LiSbF_6$. Among them, $LiPF_6$ and $LiBF_4$ are preferable. Examples of the lithium imide salt include $LiN(C_kF_{2k+1}F_{2k+1}SO_2)(C_mF_{2m+1}SO_2)$ (k and m are each independently 1 or 2). The lithium salts may be used singly or in combinations of two or more. The concentration of the lithium salt in the electrolyte solution is preferably 0.5 to 1.5 mol/L. When the concentration of the lithium salt is within this range, the density, viscosity, electric conductivity and the like are easy to be adjusted to appropriate ranges.

Moreover, an additive (excluding aniline derivative represented by the formula (1) above) may be added to the non-aqueous electrolyte solution so as to form a high-quality SEI film on the surface of a negative electrode. The SEI film has functions of suppressing reactivity with an electrolyte solution and of facilitating a desolvation reaction associated with insertion/desorption of lithium ions to prevent structure deterioration of an active material. Examples of such an additive include propanesultone, vinylene carbonate, and cyclic disulfonic ester. The amount of the additive added in the non-aqueous electrolyte solution is preferably 0.2 mass % to 5 mass % based on the total mass of the non-aqueous electrolyte solution.

(Positive Electrode Active Material)

A positive electrode in the present embodiment preferably contains a positive electrode active material having an operating potential of 4.5 V or more versus lithium metal (hereinafter, also referred to as "5 V-class active material"). More specifically, the positive electrode active material used in the present embodiment preferably has a charge-discharge region of 4.5 V or more versus lithium metal.

As the 5 V-class active material, a lithium-containing composite oxide is preferable. Examples of the 5 V-class active material of the lithium-containing composite oxide include a spinel type lithium-manganese composite oxide, an olivine type lithium-manganese-containing composite oxide, an inverse-spinel type lithium-manganese-containing composite oxide, and a $Li_2MnO_3$-based solid solution.

In particular, as the positive electrode active material, a lithium-manganese composite oxide represented by the following formula (2) is preferably used.

$$Li_a(M_xMn_{2-x-y}A_y)(O_{4-w}Z_w) \quad (2)$$

wherein $0.4 \leq x \leq 1.2$, $0 \leq y$, $x+y<2$, $0 \leq a \leq 1.2$, and $0 \leq w \leq 1$, M is at least one selected from the group consisting of Co, Ni, Fe, Cr, and Cu, A is at least one selected from the group consisting of Li, B, Na, Mg, Al, Ti, Si, K, and Ca, and Z is at least one of F and Cl.

It is more preferable that M contain only Ni, or Ni as a major component and one or more kinds of Co and Fe. It is more preferable that A be one or more kinds of B, Mg, Al, and Ti. It is more preferable that Z be F. Such a substitution element stabilizes the crystal structure and functions to suppress deterioration of the active material.

The average particle diameter ($D_{50}$) of the positive electrode active material is preferably 1 to 50 μm, and more preferably 5 to 25 μm. It is to be noted that the average particle diameter ($D_{50}$) of the positive electrode active material can be measured by a laser diffraction scattering method (Microtrac method).

The 5 V-class active material may be a positive electrode active material other than the formula (2) above provided that it is a positive electrode active material having a charge-discharge region of 4.5 V (vs. Li/Li$^+$) or more versus lithium metal. It is considered that quality and stability of the film formed on the surface of the positive electrode active material are dominantly influenced by the potential and are relatively insulated from the direct influence due to the composition of the active material.

As other examples of the 5 V-class active material, for example, an olivine composite oxide represented by $Li_xMPO_4F_y$ ($0 \leq x \leq 2$, $0 \leq y \leq 1$, and M is at least one of at least Co and Ni.); a Si-containing composite oxide represented by $Li_xMSiO_4$ ($0 \leq x \leq 2$, M: at least one of Mn, Fe, and Co); a layered-type composite oxide represented by $Li_x[Li_aM_bMn_{1-a-b}]O_2$ ($0 \leq x \leq 1$, $0.02 \leq a \leq 0.3$, and $0.1 < b < 0.7$, and M is at least one of at least Ni, Co, Fe, and Cr); and the like can be used. The positive electrode active materials may be used singly or in combinations of two or more.

Furthermore, in the present embodiment, the positive electrode active material may contain a 4 V-class positive electrode active material such as lithium cobaltate.

(Negative Electrode Active Material)

A negative electrode active material is not particularly limited, and for example, carbon materials such as graphite and amorphous carbon can be used. From the view point of an energy density, it is preferred to use graphite as the negative electrode active material. Moreover, as the negative electrode active material, in addition to the carbon materials, for example, material that form an alloy with Li, such as Si, Sn, and Al, a Si oxide, a Si composite oxide containing Si and another metal element other than Si, a Sn oxide, a Sn composite oxide containing Sn and another metal element other than Sn, $Li_4Ti_5O_{12}$, composite materials in which these materials are coated with carbon, and the like can also be used. The negative electrode active materials may be used singly or in combinations of two or more.

(Electrode)

A positive electrode is structured such that a positive electrode active material layer is formed on at least one surface of a positive electrode current collector, for example. The positive electrode active material layer is composed of the positive electrode active material as a main material, a binding agent, and a conductive assistant, for example. A negative electrode is structured by forming a negative electrode active material layer on at least one surface of a negative electrode current collector, for example. The negative electrode active material layer is composed of the negative electrode active material as a main material, a binding agent, and a conductive assistant, for example.

Examples of the binding agent used in the positive electrode include polyvinylidene fluoride (PVDF) and acrylic polymer. Examples of the binding agent used in the negative electrode include, in addition to the above, styrene-butadiene rubber (SBR). When an aqueous binding agent such as SBR emulsion is used, a thickening agent such as carboxymethyl cellulose (CMC) can also be used.

As the conductive assistant, in both the positive electrode and the negative electrode, for example, carbon materials such as carbon black, granular graphite, flake graphite, and carbon fiber can be used. In particular, in the positive electrode, carbon black with low crystallinity is preferably used.

As the positive electrode current collector, for example, aluminum, stainless steel, nickel, titanium, or alloys thereof can be used. As the negative electrode current collector, for example, copper, stainless steel, nickel, titanium, or alloys thereof can be used.

For example, the electrode can be obtained by dispersing and kneading the active material, the binding agent, and the conductive assistant in a solvent such as N-methyl-2-pyrrolidone (NMP) at a predetermined blending amount, and by applying the obtained slurry to the current collector to form the active material layer. The obtained electrode can be adjusted to an appropriate density by compressing it by a roll pressing method or the like.

(Separator)

A separator is not particularly limited, and for example, a porous film made of a polyolefin such as polypropylene and polyethylene, or a fluorine resin, an inorganic separator made of cellulose or glass, and the like can be used.

(Outer Package)

As an outer package, for example, a can of coin-type, square-type, cylindrical-type or the like and a laminated outer package can be used, and from the viewpoints of capable of reducing the weight and for the purposes of improving battery energy density, a laminated outer package using a flexible film composed of a layered body of a synthetic resin and metal foil is preferable. A laminated-type battery also excels in a heat-radiating property, and thus, is suitable for a battery for a vehicle such as an electric vehicle.

In the case of a laminated-type secondary battery, as the outer package, for example, an aluminum laminated film, a SUS laminated film, a laminated film of polypropylene, polyethylene or the like coated with silica, and the like can be used. In particular, from the viewpoint of suppressing volume expansion and from the viewpoint of cost, the aluminum laminated film is preferably used.

(Secondary Battery)

The configuration of a secondary battery according to the present embodiment is not particularly limited, and for example, it may be configured such that an electrode element in which the positive electrode and the negative electrode are arranged to be opposed to each other, and the electrolyte solution are enclosed in the outer package. The shape of the secondary battery is not particularly limited, and examples thereof include a cylindrical type, a flat wound square type, a layered square type, a coin type, a flat wound laminated type, and a layered laminated type.

As one example of the secondary battery according to the present embodiment, a laminated-type secondary battery is shown in FIG. 1. In the secondary battery shown in FIG. 1, a separator 5 is sandwiched between a positive electrode and a negative electrode, in which the positive electrode is composed of a positive electrode active material layer 1 containing a positive electrode active material and a positive electrode binder, and a positive electrode current collector 3, and the negative electrode is composed of a negative electrode active material layer 2 containing a negative electrode active material capable of absorbing and releasing lithium, and a negative electrode current collector 4. The positive electrode current collector 3 is connected to a positive electrode tab 8, and the negative electrode current collector 4 is connected to a negative electrode tab 7. A laminated outer package 6 is used as the outer package, and the inside of the secondary battery is filled with the non-aqueous electrolyte solution according to the present embodiment.

(Method of Producing Secondary Battery)

A method of producing the secondary battery according to the present embodiment is not particularly limited, and examples thereof include a method shown below. The positive electrode tab and the negative electrode tab are connected to the positive electrode and the negative electrode for a secondary battery according to the present embodiment via the positive electrode current collector and the negative electrode current collector, respectively. The positive electrode and the negative electrode are arranged to be opposed to each other with the separator sandwiched therebetween and layered to produce an electrode layered body. The electrode layered body is housed in the outer package and soaked in the electrolyte solution. The outer package is sealed such that a part of the positive electrode tab and a part of the negative electrode tab protrude outward to produce the secondary battery.

EXAMPLES

Hereinafter, Examples of the present embodiment will be described in detail, but the present embodiment is not limited only to Examples below.

Example 1

(Preparation of Negative Electrode)

Natural graphite powder (average particle diameter ($D_{50}$): 20 μm, specific surface area: 1 $m^2$/g) as a negative electrode active material and PVDF as a binding agent were uniformly dispersed in NMP at a mass ratio of 95:5 to prepare a negative electrode slurry. The negative electrode slurry was applied on a copper foil having a thickness of 15 μm, which is a negative electrode current collector, and then, dried at 125° C. for 10 minutes to evaporate NMP to form a negative electrode active material layer, and further pressed to produce a negative electrode. The weight of the negative electrode active material layer per unit area after drying was set to 0.008 g/c $m^2$.

(Preparation of Positive Electrode)

$LiNi_{0.5}Mn_{1.5}O_4$ powder (average particle diameter ($D_{50}$): 10 μm, specific surface area: 0.5 $m^2$/g) as a positive electrode active material was prepared. The positive electrode active material, PVDF as a binding agent, and carbon black as a conductive assistant were uniformly dispersed in NMP at a mass ratio of 93:4:3 to prepare a positive electrode slurry. The positive electrode slurry was applied on an aluminum foil having a thickness of 20 μm, to be a positive electrode current collector, and then, dried at 125° C. for 10 minutes to evaporate NMP to produce a positive electrode. The weight of the positive electrode active material layer per unit area after drying was set to 0.018 g/$cm^2$.

(Non-Aqueous Electrolyte Solution)

A non-aqueous solvent was prepared by mixing EC, DMC, and fluorinated ether (FE) represented by $H(CF_2)_2 CH_2OCF_2CF_2H$ as a fluorine-containing solvent at a ratio of EC:DMC:FE=40:20:40 (volume ratio). The concentration of the fluorine-containing solvent at this time was 40 vol % based on the total volume of the non-aqueous solvent. $LiPF_6$ as an electrolyte was dissolved in this non-aqueous solvent at a concentration of 0.8 mol/L. In this electrolyte solution, 0.5 mass % of 2,5-dimethoxyaniline described above as an aniline derivative, based on the total mass of the non-aqueous electrolyte solution, was dissolved to prepare a non-aqueous electrolyte solution.

(Preparation of Laminated-Type Battery)

Each of the positive electrode and the negative electrode produced as described above was cut out into 5 cm×6.0 cm. One side of 5 cm×1 cm of the same is a part on which the electrode active material layer is not formed so as to be connected to a tab (unapplied part), and the part on which the electrode active material layer is formed is 5 cm×5 cm. A width 5 mm×length 3 cm×thickness 0.1 mm aluminum positive electrode tab was ultrasonic-welded to the unapplied part of the positive electrode with a length of 1 cm. Moreover, a nickel negative electrode tab having the same size as the positive electrode tab was ultrasonic-welded to the unapplied part of the negative electrode. The above-described negative electrode and positive electrode were arranged on both surfaces of a separator having 6 cm×6 cm and made of polyethylene and polypropylene, such that the electrode active material layers were stacked through the separator to obtain an electrode layered body. Two pieces of 7 cm×10 cm aluminum laminated film were bonded by thermal fusion bonding at three sides, excluding one of the long sides, with a width of 5 mm to prepare a sac-like laminated outer package. The above-described electrode layered body was inserted 1 cm apart from one of the short sides of the laminated outer package. 0.2 g of the above-described non-aqueous electrolyte solution was injected and impregnated under vacuum pressure, and then, an opening was sealed by thermal fusion bonding with a width of 5 mm under reduced pressure to produce a laminated-type battery.

(Initial Charge-Discharge)

The laminated-type battery produced as described above was charged at 20° C. at a constant current of 12 mA corresponding to a 5 hour rate (0.2 C) up to 4.75 V, then subjected to 4.75 V constant voltage charge for 8 hours in total, and then subjected to constant current discharge at 60 mA corresponding to a 1 hour rate (1 C) to 3.0 V.

(Cycle Test)

After the completion of the initial charge-discharge, a charge-discharge cycle in which the laminated-type battery was charged at 1 C up to 4.75 V, then subjected to 4.75 V constant voltage charge for 2.5 hours in total, and then subjected to constant current discharge at 1 C to 3.0 V was repeated 300 times at 45° C. The ratio of the discharge capacity after 300 cycles to the initial discharge capacity was calculated as a capacity retention rate (%). Moreover, the amount of volume change (cc) was determined by subtracting the cell volume after the initial charge-discharge from the cell volume after the cycle, and the amount of volume change (cc/mAh) normalized by battery capacity, which is obtained by dividing the amount of volume change (cc) by the initial discharge capacity (mAh), was calculated. The volume was measured from the weight difference between in water and in air, using Archimedean method.

Example 2

A secondary battery was fabricated and evaluated by the same method as in Example 1 except that 2-methoxyaniline described above was used as the aniline derivative.

Example 3

A secondary battery was prepared and evaluated by the same method as in Example 1 except that 2-methylaniline described above was used as the aniline derivative.

Example 4

A secondary battery was prepared and evaluated by the same method as in Example 1 except that 2-trifluoromethylaniline described above was used as the aniline derivative.

Comparative Example 1

A secondary battery was prepared and evaluated by the same method as in Example 1 except that the aniline derivative was not added.

Comparative Example 2

A secondary battery was prepared and evaluated by the same method as in Example 1 except that unsubstituted aniline shown below was used in place of 2,5-dimethoxyaniline.

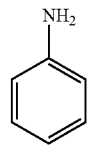

Comparative Example 3

A secondary battery was prepared and evaluated by the same method as in Example 1 except that pentafluoroaniline shown below was used in place of 2,5-dimethoxyaniline.

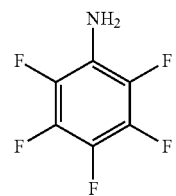

Comparative Example 4

A secondary battery was prepared and evaluated by the same method as in Example 1 except that 2,5-bis(trifluoromethyl)aniline shown below was used in place of 2,5-dimethoxyaniline.

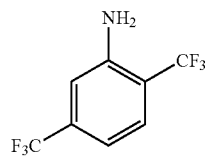

Comparative Example 5

A secondary battery was prepared and evaluated by the same method as in Example 1 except that 2,3,5-trimethylaniline shown below was used in place of 2,5-dimethoxyaniline.

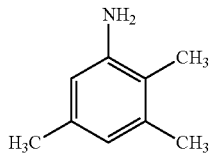

Evaluation results of Examples 1 to 4 and Comparative Examples 1 to 5 are shown in Table 1. Any of the aniline derivatives used in Examples 1 to 4 is one compound represented by the formula (1). Compared to the result of Comparative Example 1 in which the aniline additive was not added, it was confirmed that the amount of volume change was reduced in Examples 1 to 4. It is considered that this is because the aniline derivative represented by the formula (1) formed a high-quality film on the surface of the 5 V-class active material, and decomposition of the electrolyte solution under high pressure and high temperature was suppressed.

On the other hand, in Comparative Examples 2 to 5, aniline or an aniline derivative which is not included in the compound represented by the formula (1) was used. In these Comparative Examples 2 to 5, an effect of reducing gas generation was not observed. Moreover, compared to Comparative Example 1 in which the aniline additive was not added, with unsubstituted aniline (Comparative Example 2), pentafluoroaniline in which 5 hydrogen atoms of the benzene ring are substituted with fluorine atoms (Comparative Example 3), and 2,3,5-trimethylaniline including 3 methyl groups as substituents (Comparative Example 5), cycle deterioration was large, the capacity retention rate was 20% or less with less than 300 cycles, and the amount of volume change was large, that is, 5 times or more. 2,5-bis(trifluoromethyl)aniline including 2 trifluoromethyl groups (Comparative Example 4) was approximately the same as Comparative Example 1.

Example 5

A secondary battery was prepared and evaluated by the same method as in Example 4 except that the amount of 2-trifluoromethylaniline (2TFMA) added to the electrolyte solution was 0.05 mass % in the total mass of the electrolyte solution.

Example 6

A secondary battery was prepared and evaluated by the same method as in Example 4 except that the amount of 2TFMA added was 0.1 mass % in the total mass of the electrolyte solution.

Example 7

A secondary battery was prepared and evaluated by the same method as in Example 4 except that the amount of 2TFMA added was 0.3 mass % in the total mass of the electrolyte solution.

Example 8

A secondary battery was prepared and evaluated by the same method as in Example 4 except that the amount of 2TFMA added was 1.0 mass % in the total mass of the electrolyte solution.

Example 9

A secondary battery was prepared and evaluated by the same method as in Example 4 except that the amount of 2TFMA added was 1.5 mass % in the total mass of the electrolyte solution.

Evaluation results of Examples 5 to 9 are shown in Table 2. The amount of volume change became smaller when 2TFMA was added in an amount of 0.1 mass % or more and 1 mass % or less in the total mass of the electrolyte solution, which was found to be more preferable.

TABLE 1

| | Aniline Derivatives (0.5 wt. %) | Capacity Retention Rate (%) | Amount of Volume Change (cc/mAh) |
|---|---|---|---|
| Comp.Ex. 1 | None | 59 | 0.03 |
| Comp.Ex. 2 | (Unsubstituted) Aniline | <20% | >0.2 |
| Comp.Ex. 3 | Pentafluoroaniline | <20% | >0.2 |
| Comp.Ex. 4 | 2,5-Bis(trifluoromethyl) aniline | 57 | 0.034 |
| Comp.Ex. 5 | 2,3,5-Trimethylaniline | <20% | >0.2 |
| Ex. 1 | 2,5-Dimethoxyaniline | 56 | 0.022 |
| Ex. 2 | 2-Methoxyaniline | 57 | 0.021 |
| Ex. 3 | 2-Methylaniline | 58 | 0.025 |
| Ex. 4 | 2-Trifluoromethylaniline | 60 | 0.020 |

Comp.Ex.: Comparative Example
Ex.: Example

TABLE 2

| | Amount of 2TFMA Added (wt. %) | Capacity Retention Rate (%) | Amount of Volume Change (cc/mAh) |
|---|---|---|---|
| Ex. 5 | 0.05 | 59 | 0.029 |
| Ex. 6 | 0.1 | 60 | 0.026 |
| Ex. 7 | 0.3 | 60 | 0.023 |
| Ex. 8 | 1 | 58 | 0.025 |
| Ex. 9 | 1.5 | 57 | 0.029 |

Ex.: Example

Comparative Example 6

A non-aqueous solvent was prepared by mixing EC, DMC, fluorinated ether (FE) represented by $H(CF_2)_2CH_2OCF_2CF_2H$ as a fluorine-containing solvent, and fluorinated phosphate ester (FP) represented by $O=P(OCH_2CF_3)_3$ at a ratio of EC:DMC:FE:FP=35:15:25:25 (volume ratio). The concentration of the fluorine-containing solvent at this time was 50 vol % based on the total volume of the non-aqueous solvent. $LiPF_6$ as an electrolyte was dissolved in this non-aqueous solvent at a concentration of 0.8 mol/L. A secondary battery was prepared and evaluated by the same method as in Comparative Example 1 except that this non-aqueous electrolyte solution was used.

Example 10

A secondary battery was prepared and evaluated by the same method as in Comparative Example 6 except that 0.5 mass % of 2TFMA was dissolved in the non-aqueous electrolyte solution, based on the total mass of the non-aqueous electrolyte solution.

Comparative Example 7

A non-aqueous solvent was prepared by mixing EC, DMC, fluorinated ether (FE) represented by H(CF$_2$)$_2$CH$_2$OCF$_2$CF$_2$H as a fluorine-containing solvent, and fluorinated phosphate ester (FP) represented by O=P(OCH$_2$CF$_3$)$_3$ at a ratio of EC:DMC:FE:FP=30:10:20:40 (volume ratio). The concentration of the fluorine-containing solvent at this time was 60 vol % based on the total volume of the non-aqueous solvent. LiPF$_6$ as an electrolyte was dissolved in this non-aqueous solvent at a concentration of 0.8 mol/L. A secondary battery was prepared and evaluated by the same method as in Comparative Example 1 except that this non-aqueous electrolyte solution was used.

Example 11

A secondary battery was prepared and evaluated by the same method as in Comparative Example 7 except that the non-aqueous electrolyte solution in which 0.5 mass % of 2TFMA was dissolved in the non-aqueous electrolyte solution, based on the total mass of the non-aqueous electrolyte solution, was used.

Evaluation results of Comparative Examples 6 and 7, and Examples 10 and 11 are shown in Table 3. When the concentration of the fluorine-containing solvent was 50 vol % based on the total volume of the non-aqueous solvent, the amount of volume change was reduced from 0.018 to 0.01 cc/mAh, namely by 44%, by the addition of 2TFMA was added. Moreover, when the concentration of the fluorine-containing solvent was 60 vol % based on the total volume of the non-aqueous solvent, the amount of volume change was reduced from 0.0085 to 0.0043 cc/mAh, namely by 49%, by the addition of 2TFMA. In contrast, in Comparative Example 1 and Example 4, the concentration of the fluorine-containing solvent was 40 vol % based on the total volume of the non-aqueous solvent, and the amount of volume change was reduced from 0.03 to 0.02 cc/mAh, namely by 33%, by the addition of 2TFMA. From this result, it was found that, an effect of suppressing the amount of volume change, that is, suppressing gas generation was larger by using, in particular, the non-aqueous electrolyte solution having the concentration of the fluorine-containing solvent of 50 vol % or more in combination with the aniline derivative represented by the formula (1).

TABLE 3

| Concentration of Fluorine-Containing Solvent (vol. %) | Amount of 2TFMA Added (wt. %) | Capacity Retention Rate (%) | Amount of Volume Change (cc/mAh) |
|---|---|---|---|
| Comp.Ex.6 | 50 | 0.0 | 59 | 0.018 |
| Ex.10 | 50 | 0.5 | 60 | 0.010 |
| Comp.Ex.7 | 60 | 0.0 | 60 | 0.0085 |
| Ex.11 | 60 | 0.5 | 60 | 0.0043 |

Comp.Ex.: Comparative Example
Ex.: Example

EXPLANATION OF SYMBOLS 1 positive electrode active material layer
2 negative electrode active material layer
3 positive electrode current collector
4 negative electrode current collector
5 separator
6 laminated outer package
7 negative electrode tab
8 positive electrode tab

The invention claimed is:

1. A non-aqueous electrolyte solution comprising:
   at least one aniline derivative represented by the following formula (1); and
   a non-aqueous solvent:

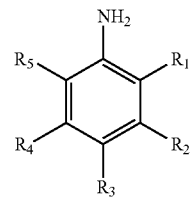

(1)

wherein at least one of R$_1$ to R$_5$ represents a hydrogen atom, a halogen atom, alkyl group, vinyl group, alkoxy group, halogenated alkyl group, halogenated vinyl group, or halogenated alkoxy group, wherein
the number of carbon atoms of each of the alkyl group, the alkoxy group, the halogenated alkyl group, and the halogenated alkoxy group is 1 or 2; and
the total number of halogen atoms in formula (1) is 5 or less, and
1 or 2 of R$_1$ to R$_5$ is selected from an alkyl group, a vinyl group, alkoxy group, a halogenated alkyl group, a halogenated vinyl group, or a halogenated alkoxy group.

2. The non-aqueous electrolyte solution according to claim 1, wherein, in the formula (1), the total number of carbon atoms contained in the substituents R$_1$ to R$_5$ is 1 or 2.

3. The non-aqueous electrolyte solution according to claim 1, wherein the halogen atom contained in the aniline derivative represented by the formula (1) is fluorine.

4. The non-aqueous electrolyte solution according to claim 1, wherein the aniline derivative represented by the formula (1) is at least one selected from trifluoromethylaniline, methoxyaniline, and methylaniline.

5. The non-aqueous electrolyte solution according to claim 1, wherein a content of the aniline derivative represented by the formula (1) is 0.1 mass % or more and 1 mass % or less in a total mass of the non-aqueous electrolyte solution.

6. The non-aqueous electrolyte solution according to claim 1, wherein the non-aqueous solvent comprises a fluorine-containing solvent.

7. The non-aqueous electrolyte solution according to claim 6, wherein a content of the fluorine-containing solvent is 50 vol % or more based on a total volume of the non-aqueous solvent.

8. The non-aqueous electrolyte solution according to claim 6, wherein the fluorine-containing solvent comprises at least one selected from a fluorinated ether compound and a fluorinated phosphate ester compound.

9. A lithium-ion secondary battery comprising the non-aqueous electrolyte solution according to claim 1.

10. The lithium-ion secondary battery according to claim 9, further comprising a positive electrode comprising a positive electrode active material having an operating potential of 4.5 V or more versus lithium metal.

11. The lithium-ion secondary battery according to claim 10, wherein the positive electrode active material is represented by the following formula (2):

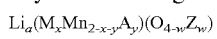

(2)

wherein 0.4≤x≤1.2, 0≤y, x+y<2, 0≤a≤1.2, and 0≤w≤1, M is at least one selected from the group consisting of Co, Ni, Fe, Cr, and Cu, A is at least one selected from the group consisting of Li, B, Na, Mg, Al, Ti, Si, K, and Ca, and Z is at least one of F and Cl.

12. A method of producing a non-aqueous electrolyte solution comprising:
   a step of mixing at least one aniline derivative represented by the following formula (1), and a non-aqueous solvent:

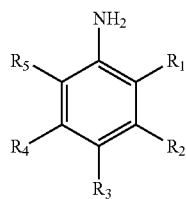
(1)

wherein at least one of $R_1$ to $R_5$ represents a hydrogen atom, a halogen atom, alkyl group, vinyl group, alkoxy group, halogenated alkyl group, halogenated vinyl group, or halogenated alkoxy group, wherein the number of carbon atoms of each of the alkyl group, the alkoxy group, the halogenated alkyl group, and the halogenated alkoxy group is 1 or 2; and the total number of halogen atoms in formula (1) is 5 or less, and 1 or 2 of $R_1$ to $R_5$ is selected from an alkyl group, a vinyl group, alkoxy group, a halogenated alkyl group, a halogenated vinyl group, or a halogenated alkoxy group.

* * * * *